(12) United States Patent
Sugiyama

(10) Patent No.: US 8,867,088 B2
(45) Date of Patent: Oct. 21, 2014

(54) INFORMATION PROCESSING APPARATUS FOR SELECTING A TEMPLATE IN WHICH AT LEAST ONE IMAGE IS TO BE ARRANGED, CONTROL METHOD OF INFORMATION PROCESSING APPARATUS FOR SELECTING A TEMPLATE IN WHICH AT LEAST ONE IMAGE IS TO BE ARRANGED, AND STORAGE MEDIUM STORING A PROGRAM FOR SELECTING A TEMPLATE IN WHICH AT LEAST ONE IMAGE IS TO BE ARRANGED

(75) Inventor: Mikiko Sugiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 13/289,329

(22) Filed: Nov. 4, 2011

(65) Prior Publication Data
US 2012/0113475 A1  May 10, 2012

(30) Foreign Application Priority Data

Nov. 8, 2010  (JP) ................................. 2010-250059

(51) Int. Cl.
| | |
|---|---|
| *G06K 15/00* | (2006.01) |
| *G06T 11/60* | (2006.01) |
| *G06F 17/24* | (2006.01) |
| *H04N 1/00* | (2006.01) |

(52) U.S. Cl.
CPC .............. *G06T 11/60* (2013.01); *G06F 17/248* (2013.01); *H04N 1/00196* (2013.01)
USPC ......................................................... 358/1.18

(58) Field of Classification Search
None
See application file for complete search history.

(56) References Cited

U.S. PATENT DOCUMENTS

| | | | | |
|---|---|---|---|---|
| 7,286,723 | B2* | 10/2007 | Taugher et al. ............... | 382/305 |
| 7,545,521 | B2 | 6/2009 | Hanamoto | |
| 2004/0230966 | A1* | 11/2004 | Morris et al. .................. | 717/169 |
| 2007/0064121 | A1* | 3/2007 | Issa et al. .................... | 348/231.2 |
| 2011/0205399 | A1* | 8/2011 | Gao et al. ................. | 348/231.99 |

FOREIGN PATENT DOCUMENTS

| | | |
|---|---|---|
| JP | 2002-329191 A | 11/2002 |
| JP | 2004-030118 A | 1/2004 |
| JP | 2005-117238 A | 4/2005 |
| JP | 2009-246822 A | 10/2009 |
| JP | 2010-068212 A | 3/2010 |
| JP | 2010-140383 A | 6/2010 |

* cited by examiner

*Primary Examiner* — Jeremiah Bryar
(74) *Attorney, Agent, or Firm* — Canon U.S.A., Inc. IP Division

(57) ABSTRACT

An information processing apparatus recommends a template having a sense of unity through an entirety to each image when a user creates an album. The information processing apparatus includes a selection unit configured to select a template for arranging any one of the plurality of images based on imaging locations of a plurality of images to be used in the album, and an arranging unit configured to arrange the plurality of images to the plurality of templates selected by the selection unit, respectively.

7 Claims, 12 Drawing Sheets

| SCALING RATIO | DISTANCE |
|---|---|
| 1/4500 | ~100m |
| 1/9000 | 100m~250m |
| 1/18000 | 250m~500m |
| 1/360000 | 500m~1km |
| 1/750000 | 1km~2.5km |
| 1/1500000 | 2.5km~5km |
| 1/3000000 | 5km~10km |
| 1/6000000 | 10km~20km |
| 1/12000000 | 20km~40km |
| 1/24000000 | 40km~80km |
| 1/50000000 | 80km~50km |
| 1/100000000 | 50km~300km |

FIG.2A

```
image1

<?xml version="1.0" encoding="shift_JIS">
<PHOTO>
<Keyword="time">20100708142445
<Keyword="GPSLatitudeRef">N
<Keyword="GPSLatitude">38/1,37/1,5236/100
<Keyword="GPSLogitudeRef">E
<Keyword="GPSLogitude">139/1,52/1,4760/100
<Keyword="place">DL Area
..
<PHOTO>
```

21 / 22

FIG.2B image1 — 23

| image1 | | |
|---|---|---|
| | time | 20100708142445 |
| | GPSLatitudeRef | N |
| | GPSLatitude | 38/1,37/1,5236/100 |
| | GPSLogitudeRef | E |
| | GPSLogitude | 139/1,52/1,4760/100 |
| | place | DL Area |
| | .. | .. |

| Image filename | time | GPSLatitudeRef | GPS Latitude | GPSLogitudeRef | GPS Longitude |
|---|---|---|---|---|---|
| A | 20101008 140005 | N | 38 degrees, 38 minutes, and 9.23 seconds | E | 139 degrees, 52 minutes, and 42.6 seconds |
| B | 20101008 141010 | N | 38 degrees, 38 minutes, and 1.34 seconds | E | 139 degrees, 52 minutes, and 44.1 seconds |
| C | 20101008 151010 | N | 38 degrees, 37 minutes, and 49.76 seconds | E | 139 degrees, 52 minutes, and 4.09 seconds |
| D | 20101008 152040 | N | 38 degrees, 37 minutes, and 55.12 seconds | E | 139 degrees, 52 minutes, and 4.63 seconds |
| E | 20101008 153040 | N | 38 degrees, 38 minutes, and 52.00 seconds | E | 139 degrees, 52 minutes, and 5.62 seconds |
| F | 20101008 183245 | N | 38 degrees, 37 minutes, and 36.99 seconds | E | 139 degrees, 53 minutes, and 36.99 seconds |

FIG.4

| SCALING RATIO | DISTANCE |
|---|---|
| 1/4500 | ~100m |
| 1/9000 | 100m~250m |
| 1/18000 | 250m~500m |
| 1/360000 | 500m~1km |
| 1/750000 | 1km~2.5km |
| 1/1500000 | 2.5km~5km |
| 1/3000000 | 5km~10km |
| 1/6000000 | 10km~20km |
| 1/12000000 | 20km~40km |
| 1/24000000 | 40km~80km |
| 1/50000000 | 80km~50km |
| 1/100000000 | 50km~300km |

FIG.7

| TEMPLATE | SCALING RATIO | OPTIMUM POSITION | | APPLICABLE RANGE | |
|---|---|---|---|---|---|
| | | LATITUDE | LONGITUDE | POINT 1 | POINT 2 |
| 1 | 1/100000000 | 38::39:56.02 | 139:29:29.60 | 38::51:57.38:, 138:57:04 | 38::34:16.58 139:53:23.2 |
| 2 | 1/1000000000 | 38::39:56.02 | 139:29:29.60 | 49:42:47.47, 128:25:36.00 | 29:19:10.84, 142:40:38.4 |
| 3 | 1/100000000 | 38::37:49.76 | 139:52:4.09 | 48:30:27.42, 139:31:12.00 | 44:22:1571, 148:54:24.00 |
| 4 | 1/100000000 | 29:29:12.29 | 127:53:10.4 | 29:49:15.18 127:42:4.8 | 29:11:28.19 128:15:21.6 |
| 5 | 1/100000000 | 38::36:17.94 | 140:07:238: | 39:04:41.11 139:46:33.6 | 37:55:22.87 140:42:1.6 |
| 6 | 1/9000 | 38::36:0.73 | 140:05:52.5 | 38::36:7.25 140:05:48.4 | 38::38:47.85 140:06:3.7 |
| 7 | 1/9000 | 38::37:58.54 | 139:52:49.6 | 38::38:6.75 139:52:40.4 | 38::37:44.47 139:53:6 |
| 8 | 1/9000 | 38::37:42.28 | 139:52:52.2 | 38::37:43.25, 139:52:0.6 | 38::37:24.47, 139:53:20.9 |
| 9 | 1/9000 | 38::37:58.54 | 139:52:49.6 | 38::38:6.75 139:52:40.4 | 38::37:44.47 139:53:6 |
| 10 | 1/4500 | 38::37:54.84 | 139:52:54.9 | 38::37:56.42 139:52:52.5 | 38::37:52.97 139:52:56.75 |
| 11 | 1/4500 | 38::37:58.45 | 139:52:49.3 | 38::38:0.65, 139:52:47 | 38::37:56.75 139:52:51.15 |
| 12 | 1/4500 | 38::37:55.53 | 139:52:45.3 | 38::37:57.23 139:52:43.85 | 38::37:52.6 139:52:47.6 |
| 13 | 1/4500 | 38::38:4.38: | 139.52.53.1 | 38::38:7.32 139:52:50.2 | 38::38:2.85 139:52:54.38: |
| 14 | 1/4500 | 38::37:56.55 | 139:52:40.6 | 38::37:58.58 139:52:39 | 38::37:54.27 139:52:42.55 |
| 15 | 1/4500 | 38::38:3.33 | 139:52:46.8 | 38::38:5.24 139:52:43.4 | 38::38:1.5 139:52:49.55 |
| 16 | 1/4500 | 38::38:9.43 | 139:52:43.1 | 38::38:11.06 139:52:40.85 | 38::38:8.46 139:52:45.5 |

| TEMPLATE | SCALING RATIO | OPTIMUM POSITION | | APPLICABLE RANGE | | ADDRESS |
|---|---|---|---|---|---|---|
| | | LATITUDE | LONGITUDE | POINT 1 | POINT 2 | |
| 1 | 1/100000000 | 38::39:56.02 | 139:29:29.60 | 38::51:57.38:, 138:57:04 | 38::34:16.58 139:53:23.2 | TOKYO, JAPAN |
| 2 | 1/1000000000 | 38::39:56.02 | 139:29:29.60 | 49:42:47.47, 128:25:36.00 | 29:19:10.84, 142:40:38.4 | JAPAN |
| 3 | 1/100000000 | 38::37:49.76 | 139:52:4.09 | 48:30:27.42, 139:31:12.00 | 44:22:1571, 148:54:24.00 | HOKKAIDO, JAPAN |
| 4 | 1/100000000 | 29:29:12.29 | 127:53:10.4 | 29:49:15.18 127:42:4.8 | 29:11:28.19 128:15:21.6 | OKINAWA PREFECTURE, JAPAN |
| 5 | 1/100000000 | 38::36:17.94 | 140:07:238: | 39:04:41.11 139:46:33.6 | 37:55:22.87 140:42:1.6 | CHIBA PREFECTURE, JAPAN |
| 6 | 1/9000 | 38::36:0.73 | 140:05:52.5 | 38::36:7.25 140:05:48.4 | 38::38::47.85 140:06:3.7 | 1 XX-PORT, XX-KU, CHIBA CITY, CHIBA PREFECTURE, JAPAN |
| 7 | 1/9000 | 38::37:58.54 | 139:52:49.6 | 38::38:6.75 139:52:40.4 | 38::37:44.47 139:53:6 | 1-1 MM, WW CITY, CHIBA PREFECTURE, JAPAN |
| 8 | 1/9000 | 38::37:42.28 | 139:52:52.2 | 38::37:43.25, 139:52:0.6 | 38::37:24.47, 139:53:20.9 | 1-13 MM, WW CITY, CHIBA PREFECTURE, JAPAN |
| 9 | 1/9000 | 38::37:58.54 | 139:52:49.6 | 38::38:6.75 139:52:40.4 | 38::37:44.47 139:53:6 | 1-1 MM, WW CITY, CHIBA PREFECTURE, JAPAN |
| 10 | 1/4500 | 38::37:54.84 | 139:52:54.9 | 38::37:56.42 139:52:52.5 | 38::37:52.97 139:52:56.75 | XX |
| 11 | 1/4500 | 38::37:58.45 | 139:52:49.3 | 38::38:0.65, 139:52:47 | 38::37:56.75 139:52:51.15 | XX |
| 12 | 1/4500 | 38::37:55.53 | 139:52:45.3 | 38::37:57.23 139:52:43.85 | 38::37:52.6 139:52:47.6 | XX |
| 13 | 1/4500 | 38::38:4.38: | 139.52:53.1 | 38::38:7.32 139:52:50.2 | 38::38:2.85 139:52:54.38: | XX |
| 14 | 1/4500 | 38::37:56.55 | 139:52:40.6 | 38::37:58.58 139:52:39 | 38::37:54.27 139:52:42.55 | XX |
| 15 | 1/4500 | 38::38:3.33 | 139:52:46.8 | 38::38:5.24 139:52:43.4 | 38::38:1.5 139:52:49.55 | XX |
| 16 | 1/4500 | 38::38:9.43 | 139:52:43.1 | 38::38:11.06 139:52:40.85 | 38::38:8.46 139:52:45.5 | XX |

# INFORMATION PROCESSING APPARATUS FOR SELECTING A TEMPLATE IN WHICH AT LEAST ONE IMAGE IS TO BE ARRANGED, CONTROL METHOD OF INFORMATION PROCESSING APPARATUS FOR SELECTING A TEMPLATE IN WHICH AT LEAST ONE IMAGE IS TO BE ARRANGED, AND STORAGE MEDIUM STORING A PROGRAM FOR SELECTING A TEMPLATE IN WHICH AT LEAST ONE IMAGE IS TO BE ARRANGED

BACKGROUND OF THE INVENTION

1. Field of the Invention

The present invention relates to an information processing apparatus selecting a template when a user creates an album.

2. Description of the Related Art

Recently, a service for creating an album via the Internet has been known. In such a service, a user can register images captured by a digital camera, create an album (a photo book) using the registered images, and perform a printing order. When a user creates an album using such a service, the user can create the album by using a template prepared beforehand.

For improving appearance of the album, the template includes layout information such as decoration of a background view and arrangement positions of images. Therefore, a user can easily finish a consuming task such as a design or a layout of the album by selecting the template.

Further, U.S. Pat. No. 7,545,521 discusses a technique which automatically creates a cover template suitable for images to be laid out on an album. In U.S. Pat. No. 7,545,521, the technique compares metadata of the image data used in the album and a plurality of key words assigned to an image file to be a background image of the template. The metadata is, for example, a photographer, time and date of imaging, and imaging place. Then, the technique creates a cover template using an image file having the key words matching with the metadata.

With such a conventional technique, a user can easily select a template and create an album.

Therefore, when the conventional technique to create a cover template is applied to creating the template to perform layout of images to be used in an album, a user can create a suitable template for each image.

However, if a sense of unity through an entirety of an album created by using a plurality of images is considered, some improvements are needed in the conventional technique for creating a plurality of templates. For example, when a user creates an album using photographs captured while traveling, the templates applied to each image should change according to a scale of the travel.

For example, when a user travels in Europe, selects images captured in each country, and uses these images for creating an album, the template, which symbolizes the country of the shooting location, has more uniformity through the entirety of the album.

On the other hand, when a user creates an album by images captured in only one country, the template symbolizing the area of the captured city or district should be used for each image.

When a user creates a template in which a shooting location of image data in an album is used as a key word, the conventional technique discussed in U.S. Pat. No. 7,545,521 does not consider a shooting location of other image data used in the album. Therefore, some improvements are needed for a recommended technique for a plurality of templates, if taking a sense of unity through an entirety of an album into consideration.

SUMMARY OF THE INVENTION

The present invention is directed to an information processing apparatus capable of selecting a template in which images are arranged so as to have a sense of unity through an entirety of an album.

According to an aspect of the present invention, an information processing apparatus for arranging at least one image in at least one template includes an evaluation unit configured to select, based on imaging locations of the at least one image, the at least one template in which the at least one image is to be arranged, and a creation unit configured to arrange the at least one image in the at least one template selected by the selection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B illustrate an example of imaging information added as metadata of an image data.

FIG. 3 is a table illustrating an example of table data indicating imaging information of image data used for creating an album.

FIG. 4 is a table illustrating correspondence of a scaling ratio and a distance.

FIG. 7 is a table illustrating an example of a template position information setting table.

FIG. 11 illustrates another example of a template position information setting table.

DESCRIPTION OF THE EMBODIMENTS

Various exemplary embodiments, features, and aspects of the invention will be described in detail below with reference to the drawings.

Figure 1:
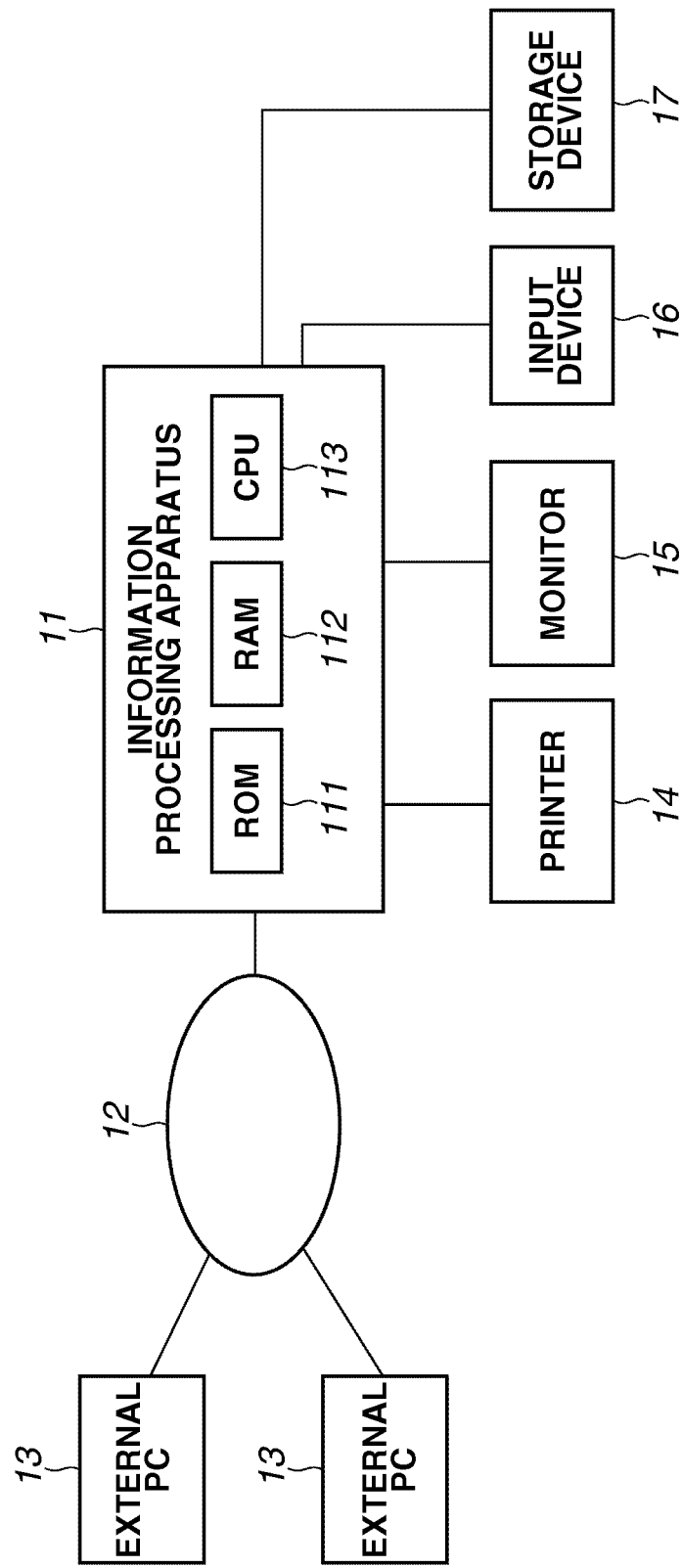
FIG. 1 is an example block diagram illustrating a schematic configuration of an information processing apparatus according to an exemplary embodiment of the present invention.

First, referring to FIG. 1, a configuration of an information processing apparatus 11 will be described. The information processing apparatus 11 executes template position information setting processing and print product creation processing, which are used in the present exemplary embodiment.

The information processing apparatus 11 used in the present exemplary embodiment can create an album (photo book) from input image data, generate the created album as printing data, and output it. Further, the information processing apparatus 11 can recommend templates used at a time of creating an album to a user and present them as a candidate.

The information processing apparatus 11 includes a central processing unit (CPU) 13, a random access memory (RAM) 112, and a read only memory (ROM) 111. Further, the information processing apparatus 11 includes input/output interfaces (not illustrated) for connecting the information processing apparatus 11 to a printer 14, a monitor 15, an input device 16, a storage device 17, a network 12, and other external apparatuses.

The CPU 113 controls the entire information processing apparatus 11 by executing an operation system program stored in the storage device 17 or the ROM 111. Further, the CPU 113 loads a control program stored in the ROM 111 to the RAM 112, and executes it, so as to realize each functional configuration of the information processing apparatus 11, perform calculation, and process information. The CPU 113 performs each processing by controlling each hardware unit.

The ROM 111 stores various kinds of control programs. The RAM 112 is a work memory of CPU 113.

The network 12 is a communication network connected with the information processing apparatus 11 and an external personal computer (PC) 13, and used for exchanging information between the connected apparatuses. The external PC 13 can be connected to the information processing apparatus 11 via the network 12, and perform sending/receiving of data to/from the information processing apparatus 11.

The printer 14 is a printer for printing output print data having created by the information processing apparatus 11. In addition, the printer 14 can be connected to the network 12. The monitor 15 is a display device for displaying image information output from the information processing apparatus 11.

The input device 16 is an input device for inputting information to the information processing apparatus 11, for example, a keyboard and a pointing device. The storage device 17 is a storage device, such as a hard disk drive (HDD), for storing image data and templates.

Figure 6:
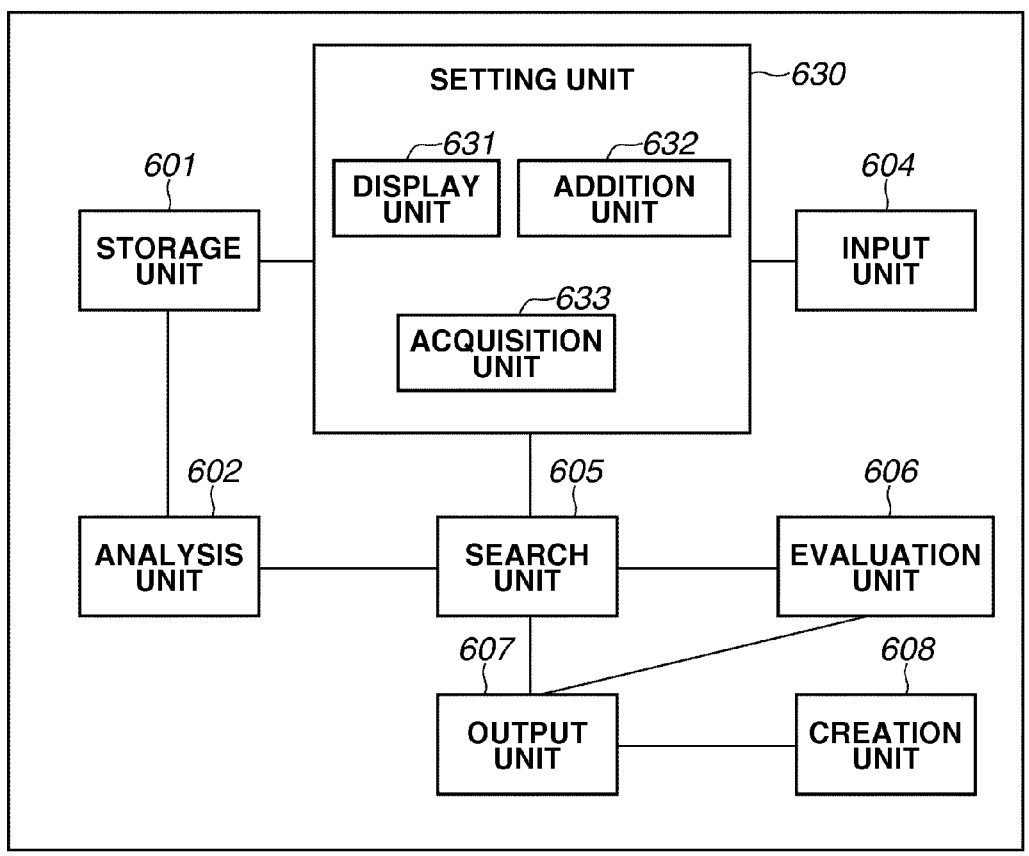
FIG. 6 illustrates an example of a function block diagram of the information processing apparatus according to an exemplary embodiment.

FIG. 6 is a block diagram illustrating a function configuration of the information processing apparatus 11. The information processing apparatus 11 includes a storage unit 601, an analysis unit 602, a setting unit 630, an input unit 604, a search unit 605, an evaluation unit 606, an output unit 607, and a creation unit 608. The storage unit 601 performs control to store image data in the RAM 112 or the storage device 17. The image data includes imaging information as metadata, for example, imaging location information and imaging date and time. Further, the storage unit 601 relates templates and the imaging location information added to the templates and stores thereof in the RAM 112 or the storage device 17.

The analysis unit 602 analyzes metadata of image data and acquires imaging information, such as an imaging location and imaging date and time. The setting unit 630 sets position information, such as an imaging range and an imaging location of images arrangeable in a template to the template.

Further, the setting unit 630 includes a display unit 631, an addition unit 632, and an acquisition unit 633. The display unit 631 displays a template position information setting screen illustrated in FIG. 9, and a user interface (UI) to be used when a user sets position information to a template. The addition unit 632 allocates position information to a template based on an input by a user. The acquisition unit 633 acquires range level information based on the position information set by the adding unit 632.

Then, the search unit 605 searches for candidates of templates, which are recommended for each image to be used for album creation, from the position information set to each template and the imaging location information of images to be used for creation of an album. The evaluation unit 606 evaluates each of the template candidates to images acquired by the search unit 605. The output unit 607 controls output of various kinds of data to the apparatuses connected to the information processing apparatus 11 via input/output interfaces (not illustrated).

The creation unit 608 synthesizes (arranges) the image data to be used for creating an album to templates. Further, the creation unit 608 generates print data when arrangement of all input image data, which is used for an album, to templates is ended.

Then, image data and templates previously stored in the storage device 17 will be described. In the present exemplary embodiment, the imaging information, such as imaging location information and imaging date and time, is added, as metadata, to the image data used for creating an album. In the present exemplary embodiment, the image data is configured with an Exchangeable image file format (Exif).

As one example of information indicating an imaging location of image data, for example, the information is described with an Extensible Markup Language (XML) language 22 at a binary end or a binary top of an image data 21 as illustrated in FIG. 2A.

Further, FIG. 2B is a table schematically illustrating a metadata table created by the information processing apparatus 11 when the metadata is read.

The metadata table includes image data ID 24, "key" 25, and "value" 26. The image data ID 24 is an identifier of the image data. The "key" 25 is information written in the metadata of the image data ID 24. The "value" 26 is a value of the key 25. In a case of FIG. 2B, as for the imaging location information, "GPS Latitude Ref" in the key 25 indicates north latitude/south latitude, "GPS Latitude" indicates a value of latitude, "GPS Longitude Ref" indicates east longitude/west longitude, and "GPS Longitude" indicates a value of longitude.

In a case of the image data "image 1" illustrated in FIG. 2B, the image data has the position information, in which the image is captured at north latitude 38 degrees, 37 minutes, and 52.36 seconds and east longitude 139 degrees, 52 minutes, and 47.6 seconds. Such imaging information is added to the image data captured by an imaging apparatus having an acquisition function of the position information such as a global positioning system (GPS).

Then, the template to be used in the present exemplary embodiment will be described. The template is a mount data (sample data) having a design set beforehand and indicating how contents is arranged and displayed.

A template has data concerning a design, such as a vertical size and horizontal size of an album, a pattern, and a background image, and data concerning a position and size of an image frame in which an image to be a content is arranged. Further, the template has data concerning a design such as data of a position and size of a character frame displaying character string data.

A template exists for each commercial printing material, for example, an album, a poster, and a handbill. A user can easily create a printing material by performing layout of the contents, such as image data, in the image frame in the template.

Figure 5:
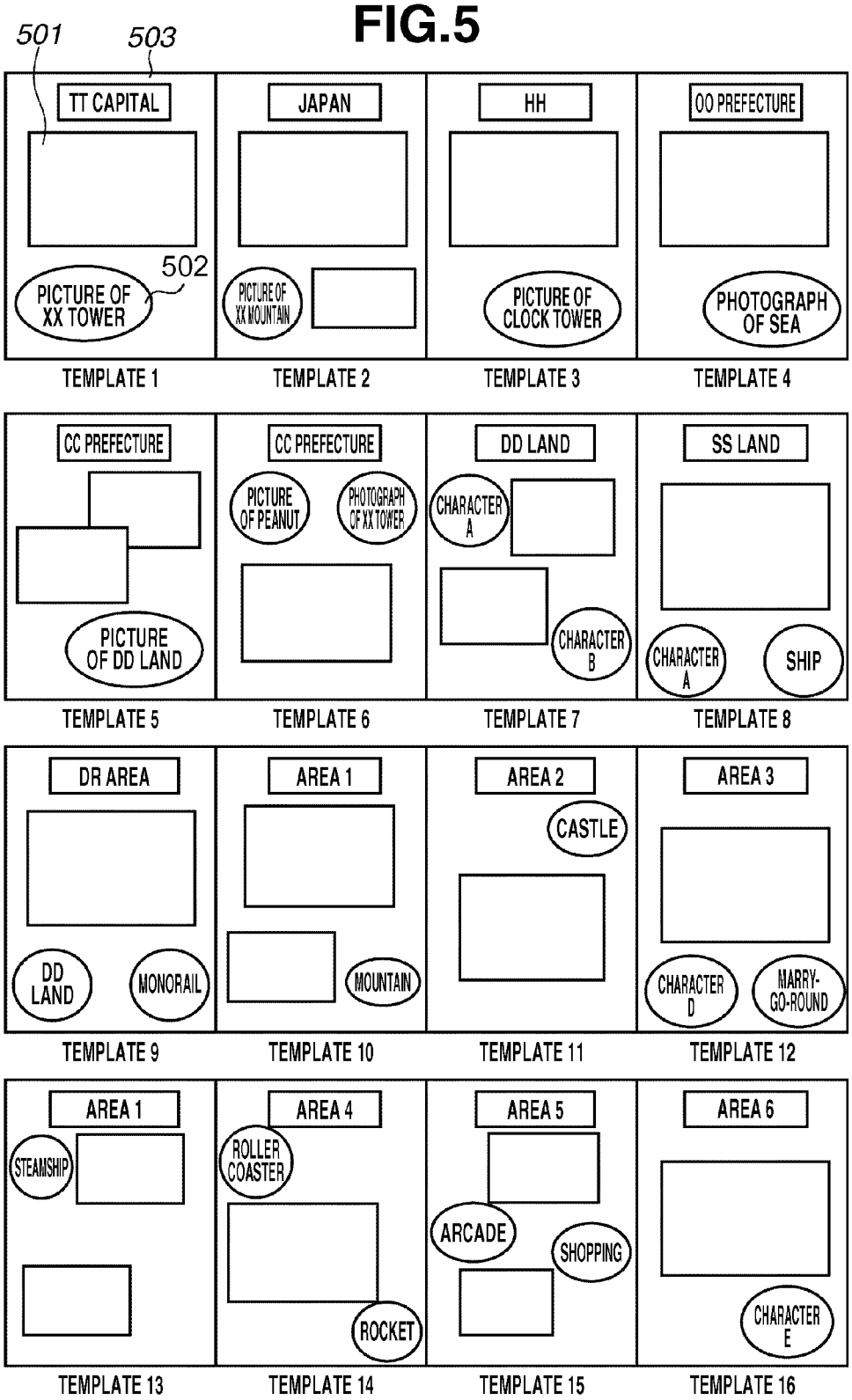
FIG. 5 illustrates example templates to be used according to an exemplary embodiment.

Example templates are illustrated in FIG. 5. Each template in FIG. 5 is a template for an album, and it is desirable to create one album by arranging a plurality of images to a plurality of templates. In these templates, there are arbitrary number of image frames 501 in which images are embedded. Coordinates of the image frame 501 are set to be (0, 0) at the upper left side of the template, and the position of the image frame is defined by the coordinates as the position information.

The template has a background image 502. The background image 502 is an image of a landmark or a district which can be related to an imaging location of image data to be laid out in the image frame 501. Character data 503 ornaments a template and, for example, a name of a district or a facility is added. For example, the template 1 in FIG. 5 is the template for inserting the image data captured in "TT" area.

The template 2 is the template for inserting the image data captured in "JAPAN" area. In the template, a design such as a picture or a geometrical pattern for representing the district or the facility has been provided.

Then, the operation using the aforementioned configuration of the information processing apparatus 11 according to the present exemplary embodiment will be described. First, the processing to add position information to the above-described template will be described. The position information indicates that the aforementioned template can be applied to images captured at a certain position range.

Figure 8:
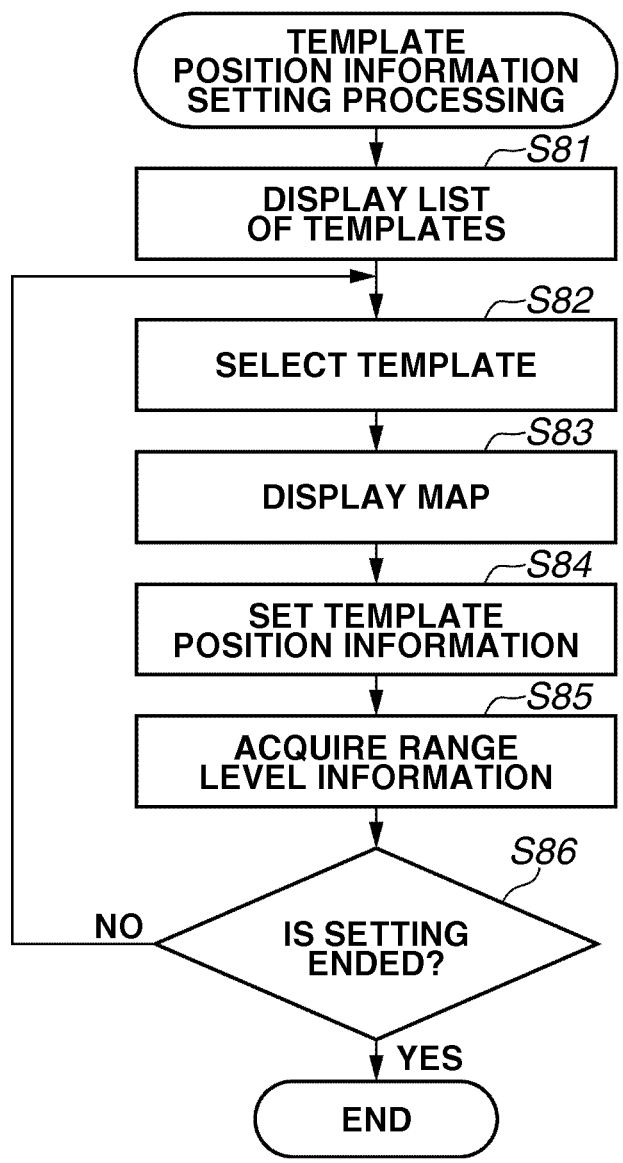
FIG. 8 is a flowchart illustrating template position information setting processing.
Figure 9A:
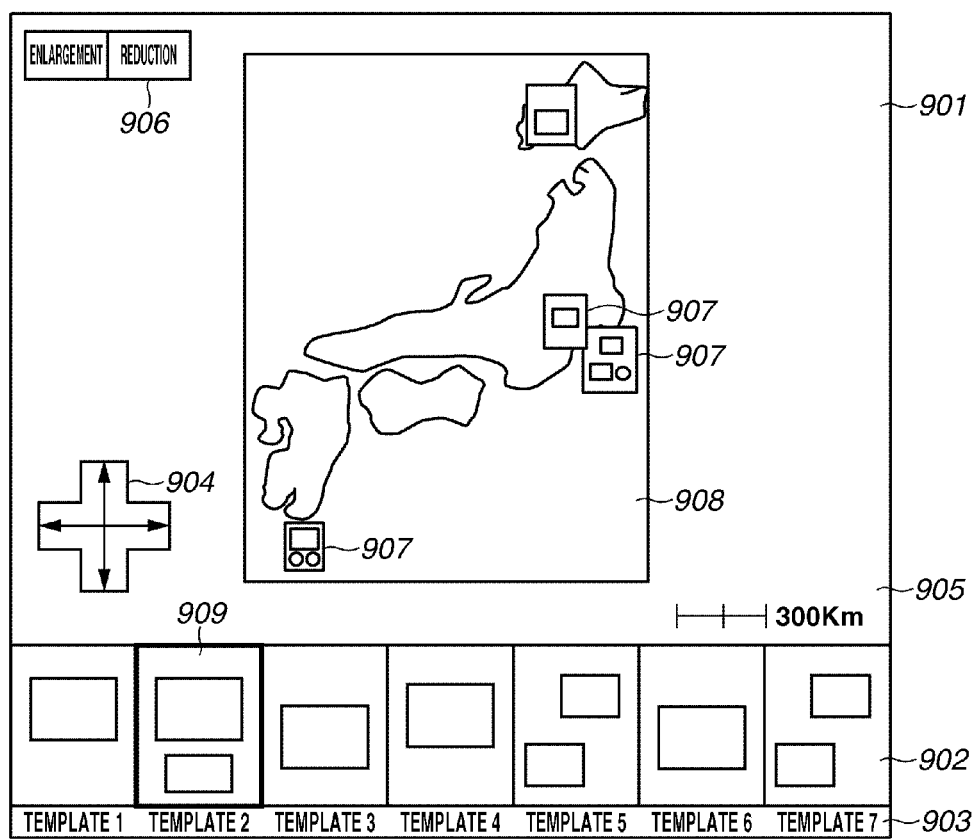
FIGS. 9A and 9B each illustrate an example of a template position information setting screen.
Figure 9B:
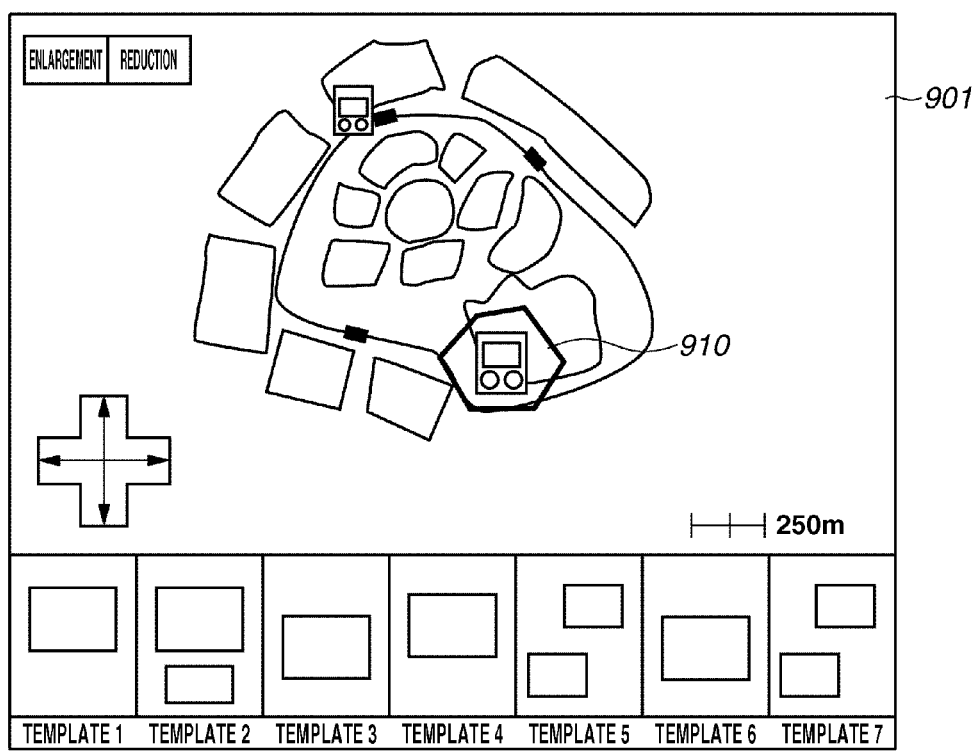

FIG. 8 illustrates a flow indicating template position information setting processing performed in the information processing apparatus 11. FIGS. 9A and 9B are each an example of the template position information setting screen displayed by the display unit 631.

In the flow illustrated in FIG. 8, at first, in step S81, the information processing apparatus 11 expands a list of templates stored in the storage device 17 on the RAM 112 by the storage unit 601. The display unit 631 displays the list of the templates. In step S82, the information processing apparatus 11 selects a template to which position information is to be added based on a user operation input by the input unit 16.

In step S83, the display unit 631 displays a map for setting position information to the selected template. Further, in step S83, for setting the position information to the template, the display unit 631 can display the map with enlargement/reduction (change of scaling ratio) based on a user operation.

In step S84, the addition unit 632 sets position information to the selected template by inputting the position information setting to the map displayed in step S83. The set position information may be written in template data, or may be held, associating it with templates as data different from the template.

In step S85, the acquisition unit 633 acquires range level information from the scaling ratio of the map used at a time of setting the position information. The range level is a degree of the grade when a scale or a degree of position information is gradated, based on an applicable range added to templates. In the present exemplary embodiment, the range level corresponds to the scaling ratio of the map used when the position information is set.

The acquisition unit 633 acquires a scaling ratio of the map used when the position information is set, and write it in the template data or holds as different data, associating it with the template. In addition, the range lever information is not limited to the scaling ration, and can be defined, corresponding to a matter indicating a scale of an applicable range, such as area information of the applicable range or a longest line distance of the applicable range.

In step S86, the information processing apparatus 11 determines whether a user continues the template position information setting processing. When there are templates to be added more with position information (NO in step S86), the information processing apparatus 11 repeats processing from step S82 to step S85, and adds position information to the templates. When there is an input to an "ending button" (not illustrated), which is displayed by the display unit 631, the template position information setting processing is ended.

The aforementioned template position information setting processing will be described further in detail, referring to FIGS. 9A and 9B.

FIGS. 9A and 9B are template position information setting screens displayed on the monitor 15. In the example illustrated in FIG. 9A, using a template position information setting screen 901, position information can be set to the template by user's input on the map displayed on a map display portion 908 in step S83.

A list display portion 902 displays a list of the templates displayed in step S81. A name portion 903 indicates each name in the template list displayed in the list display portion 902. A transfer button 904 can change a display position (display range) of the map displayed on the map display portion 908.

A scaling ratio display portion 905 displays a scaling ratio of a map presently displayed on the map display portion 908. The scaling ratio of the map displayed on the map display portion 908 can be changed by an operation of a scaling ratio changing portion 906.

In addition, the display on the scaling ratio display portion 905 changes according to the operation by the scaling ratio changing portion 906. A template 907 is a template added with position information and displayed as a thumbnail on the map display portion 908 so as to overlap the position on the map corresponding to the set position.

A selection portion 909 has a selection frame for enabling identification of a template, in which the position information will be set, from templates displayed on the template list display portion 902. When a user selects a template, which is desired to set position information in step S82, from the template list display portion 902, the selection portion 909 is displayed at the selected template.

Then, the position information setting processing illustrated in step S84 will be described. When a user performs a drag-and-drop operation of the selected template to the map displayed on the map display portion 908, a center position of the template dropped out is set as an optimum position (determined position).

A user can determine a dropped out position from a background image or character information of the template. For example, a position in which a background image is captured or a location of the land mark shown by the background image may be set to be the optimum position (determined position). In addition, the optimum position is contained in a range of the applicable range described below.

The addition unit 632 acquires a coordinate position of the set optimum position, and stores as position information. Further, the display unit 631 displays a thumbnail of the template at the place of the set optimum position. Further, the display unit 631 set an applicable range. The applicable range is an imaging location range of image data which is applicable to a template in the position information setting processing.

When a user sets the applicable range, the user can set the range on the map of the thumbnail 907 to the applicable range by enlarging or reducing the thumbnail 907 on the map display portion 908.

In addition, instead of enlarging or reducing the thumbnail 907, the applicable range can be set by drawing a rectangle on the map.

On the template position information setting screen, an example, in which a rectangle is drawn on the map at a time of setting the applicable range, is illustrated in FIG. 9B. In FIG. 9B, the area 910 is the applicable range.

In step S85, the acquisition unit 633 acquires the scaling ratio of the map, which is used at a time of setting position information, as the range level information. In the example in FIG. 9, the information processing apparatus 11 stores the scaling ratio displayed in the scaling ratio display portion 905 in the storage device, such as the RAM 112, associating the scaling ratio with the template in which the position information is set. As mentioned above, the information processing apparatus 11 holds the position information added to the set template, associating it with the template.

Accordingly, by setting the range level based on the applicable range added to the template, the information processing apparatus 11 can recommend the templates having the same range level to each image according to the imaging locations of a plurality of image data used to create an album.

FIG. 7 illustrates an example of the template position information setting table. The template position information setting table is generated by the information processing apparatus 11 as a result of the template position information setting processing, and associating the position information stored in the storage device 17 with the templates.

The template ID 701 is an ID for identifying template by a title, a file name, and an address. The scaling ratio 702 is a scaling ratio of the map used in the template information setting and acquired as range level information in step S85. The optimum position 703 is coordinate position information of the optimum position. The applicable range information 704 defines two points, which are an upper left point and an upper right point of a rectangle. In addition, the optimum position is contained in a range of the restricted rectangle.

Further, in the present exemplary embodiment, the applicable range information is defined by using a rectangle. However, the applicable range information can be defined by using a plurality of points. Further, as for the template position information setting, exclusion position information can be set. As for the exclusion position, it is prescribed that the image data captured at the exclusion position cannot be used to the template in which the exclusion position is set.

This setting method can be performed by using the template position information setting screen similar to the setting of the template position information. The template position information setting table, which has been already described and illustrated in FIG. 7, will be used in the album creation processing described below.

By the described template position information setting processing, the information processing apparatus 11 adds, to the template, the position information indicating that the template is applied to the image captured in a certain position range. Thus, the information processing apparatus 11 can recommend templates according to an imaging location of images used for creating an album.

Similarly, by setting a range level to a template, the information processing apparatus 11 can recommend the template having the same range level to each image according to the imaging locations of a plurality of images to be used for creating an album.

Figure 10:
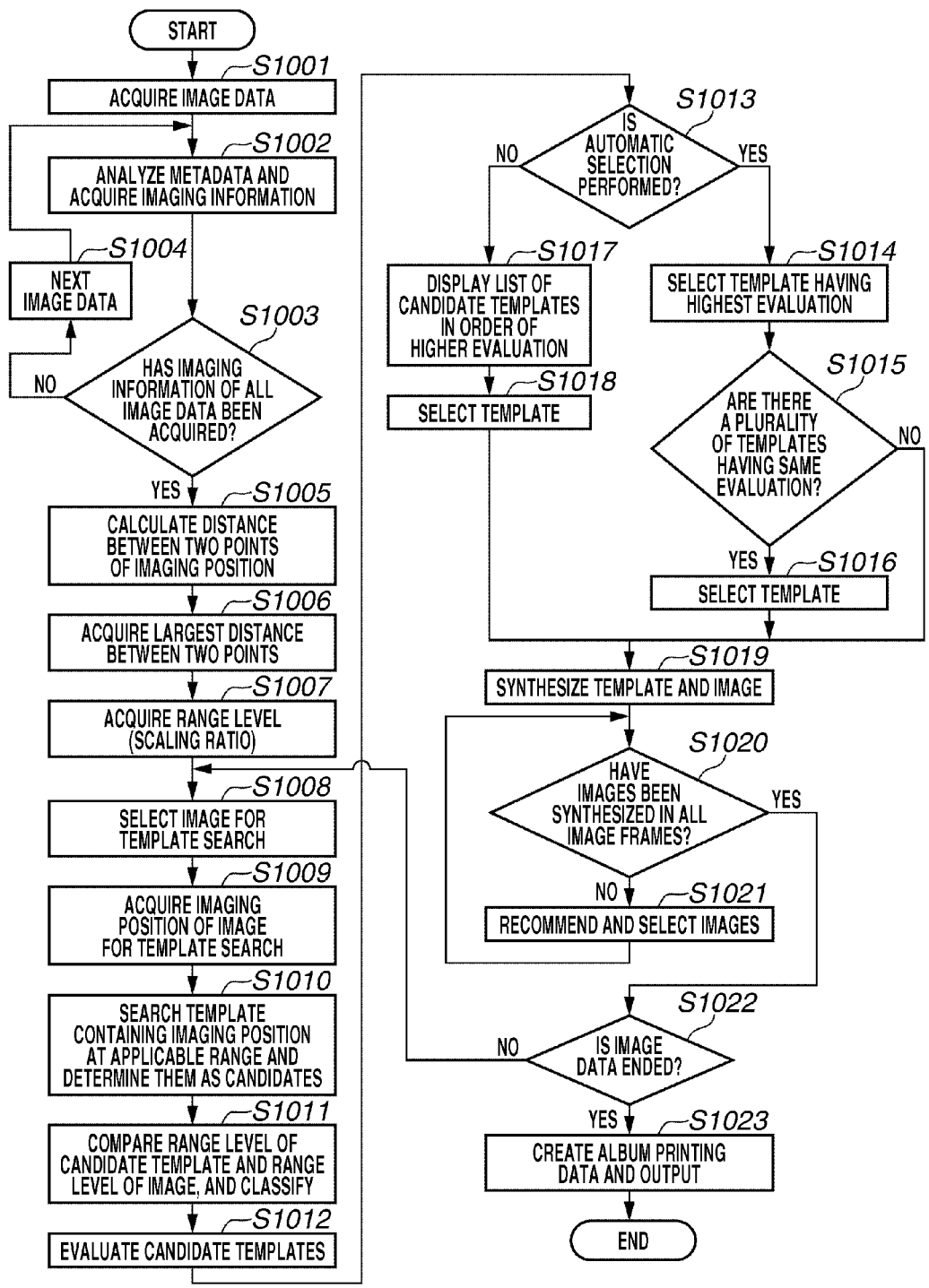
FIG. 10 is a flowchart illustrating album creation processing.

Then, the album creation processing using a template, in which position information is set, according to the present exemplary embodiment will be described referring to the flowchart illustrated in FIG. 10.

In step S1001, the information processing apparatus 11 acquires a plurality of image data used for creating an album. The information processing apparatus 11 selects image data to be used in a printing material from image data stored in the storage device 17. The selection processing of the image data can be designated by a user, or automatically selected by analyzing imaging conditions, for example, whether image shake occurs or a red-eye phenomenon occurs.

In step S1002, the analysis unit 602 analyzes metadata of the image data to be contained in the album and acquires imaging information, such as an imaging location and an imaging time. The analysis unit 602 analyzes the aforementioned metadata in which the imaging information illustrated in FIG. 2 is described, associates the acquired imaging information to the image data, and stores it in a storage device such as the RAM 112.

In step S1003, the information processing apparatus 11 determines whether the imaging information of all of the plurality of image data selected and acquired in step S1001 is acquired. When the information processing apparatus 11 determines that the imaging information is not acquired in the all image data (NO in step S1003), in step S1004, the information processing apparatus 11 reads next image data and repeat the processing in step S1002. When the information processing apparatus 11 determines that the imaging information of all the image data is acquired (YES in step S1003), the processing proceeds to step S1005.

In step S1005, the analysis unit 602 acquires a range level of the image data from the imaging location information of the acquired all image data. An acquisition method of the range level of the image data will be described referring to FIG. 3.

FIG. 3 is a table illustrating imaging information, such as an imaging time and an imaging location, of 6 data to be contained in the album. Further, the table data illustrated in FIG. 3 is generated in the RAM 112 by repeating the processing in step S1002.

FIG. 3 includes a file name 301 of the image data, an imaging time 302, a latitude 303 of the imaging place, and a longitude 304 of the imaging place. At first, the analysis unit 602 sorts all image data based on the imaging time. In the examples in FIG. 3A, the imaging order is A, B, C, D, E, and F.

The analysis unit 602 calculates a distance between imaging locations in the imaging order, for example, a distance between A and B, a distance between B and C. The calculation of the distance of between the imaging locations of two points of the imaging locations can be acquired by "Hybeny's distance calculation formula" (Formula 1).

$$D=\mathrm{sqrt}((M*dP)*(M*dP)+(N*\cos(P)*dR)*(N*\cos(P)*dR)) \quad \text{(Formula 1)}$$

where, in Formula 1, D is a distance between two points (m), P is an average latitude of two points, dP is a difference of longitude between two points, dR is a difference of latitude between two points, M is a meridian line curvature radius, and N is a prime vertical curvature radius.

Further, M (meridian line curvature radius) can be calculated from the following Formula 2.

$$M=6334834/\mathrm{sqrt}((1-0.006674*\sin(P)*\sin(P)))\hat{\ }3 \quad \text{(Formula 2)}$$

Further, N (prime vertical curvature radius) can be calculated from the following Formula 3.

$$N=6377397/\mathrm{sqrt}((1-0.006674*\sin(P))) \quad \text{(Formula 3)}$$

Using the Formula 1 to the Formula 3, the analysis unit 602 calculates the distance between each two points of the imaging locations in the imaging order. For example, to acquire the distance between two points, which are a file name A and a file name B, the analysis unit 602 analyzes the metadata to acquire a result that the image file A is captured at latitude 38 degrees, 38 minutes, and 9.23 seconds and longitude 139 degrees, 52 minutes, and 42.6 seconds.

Similarly, the analysis unit 602 analyzes the metadata to acquire a result that the image file B is captured at latitude 38 degrees, 38 minutes, and 1.34 seconds and longitude 139 degrees, 52 minutes, and 44.1 seconds. The analysis unit 602 substitutes the acquired position coordinate to the Formula 1, and acquires the calculation result, that is, D=246.082 (m).

In step S1006, the analysis unit 602 respectively acquires the distance between two points of the imaging locations in the imaging order of the input image data, and acquires the longest distance in distances of between respective two points of the imaging locations in the imaging order.

In step S1007, the analysis unit 602 acquires an image range level from the acquired distance in step S1006. The image range level is a degree for determination by comparing a range level set in the template and a scale of a position range in which the image data to be used for creating an album was captured. FIG. 4 is a correspondence list of a distance between two points and a scaling ratio.

For example, when the distance D between the two points of the above file name A and file name B is 246.082 m (D=246.082), the distance range is 100-250 m according to FIG. 4, and the corresponded scaling ratio becomes 1/9000. Thus, this scaling ratio is determined as the image range level.

Accordingly, the analysis unit 602 acquires the corresponding image range level based on the longest distance in the distances between each two points of the imaging locations in the imaging order of the input image data. By acquiring the image range level based on the longest distance in the distances between respective two points of the imaging locations, the analysis unit 602 can set the same range level to all images.

In step S1008, the search unit 605 designates image data presenting a template candidate from the image data acquired in step S1001 based on the selection by the user. In step S1009, the search unit 605 acquires the imaging location information of the designated image data, which is acquired in step S1002, from the RAM 112.

In step S1010, the search unit 605 searches for the templates containing the acquired imaging location in the applicable range and determines as candidate templates.

In step S1011, the evaluation unit 606 compares the scaling ratio of the candidate templates and the scaling ratio acquired in step S1007, which is an image range level.

At first, the evaluation unit 606 classifies templates, in which a scaling ratio as an image range level and a scaling ratio as a range level of a template are matched, as a first candidate group. The evaluation unit 606 classifies templates having a scaling ratio smaller than a scaling ratio of an image range level (the applicable range is narrow), as a second candidate groups. The evaluation unit 606 classifies templates having a scaling ratio larger than a scaling ratio of an image range level (the applicable range is wide), as a third candidate groups.

The processing will be described by using the image data illustrated in FIG. 3 and the template position information illustrated in FIG. 7. In this case, it is assumed that the image file A illustrated in FIG. 3 is selected in step S1008. Further, the scaling ratio, which is the image range level of input images A to F, is determined 1/9000 from the processing in step S1005 to step S1007.

In step S1009, the search unit 605 acquires the imaging location information of the image file A, which is "latitude 38 degrees, 38 minutes, and 9.23 seconds" and "longitude 139 degrees, 52 minutes, and 42.6 seconds". In step S1010, the search unit 605 refers to the applicable range of the template position information illustrated in FIG. 7.

The templates containing the imaging location of the image file A, which is "latitude 38 degrees, 38 minutes, and 9.23 seconds" and "longitude 139 degrees, 52 minutes, and 42.6 seconds", in the applicable range are the template 1, the template 2, the template 5, the template 7, the template 9, and the template 16. These templates are determined as candidate templates.

Then, the candidate templates having a scaling ratio "1/9000" as the range level, which is the image range level of the input images A to F, are the template 7 and the template 9. Thus, these templates are classified into the first candidate group.

The candidate template having the range level of smaller scaling ratio than an image scaling ratio "1/9000" is the template 16. Thus, the template 16 is classified into the second candidate group. The candidate templates having the range level of the larger scaling ratio than a scaling ratio "1/9000" are the template 1, the template 2, and the template 5. Thus, the template 1, the template 2, and the template 5 are classified into the third candidate group.

In step S1012, the evaluation unit 606 evaluates each candidate template and performs ranking. As for the evaluation of the candidate template, the evaluation unit 606 acquires two distances for each candidate template group by using an optimum position of the candidate template and the imaging location information of the image data, and gives higher evaluation to the nearer template in the two distances.

The distance is acquired by using the above Formula 1. By this evaluation, the ranking is determined for each candidate group.

For example, when the image data illustrated in FIG. 3 and the templates illustrated in FIG. 7 are used, the distances between the optimum position of the candidate template and the imaging location of the image data A are as follows.

The first candidate group: template 7 373.588 (m)
The first candidate group: template 9 373.588 (m)
The second candidate group: template 16 14.009 (m)
The third candidate group: template 1 35,195.732 (m)
The third candidate group: template 2 35,195.732 (m)
The third candidate group: template 5 22,431.567 (m)

In addition, in the present exemplary embodiment, it is assumed that the first candidate group has higher calculated evaluation than the second candidate group and the second candidate group has higher calculated evaluation than the third candidate group. Therefore, the candidate templates rank as the template 7, the template 9, the template 16, the template 5, the template 1, and the template 2 in order. The evaluation unit 606 stores this result in the storage device, such as the RAM 112.

In step S1013, the information processing apparatus 11 determines whether automatic selection of the templates is performed. In the determination in step S1013, the information processing apparatus 11 determines whether the automatic selection is set, based on the input by a user. When the information processing apparatus 11 determines that the automatic selection is performed (YES in step S1013), the processing proceeds to step S1014. The information processing apparatus 11 outputs the templates having higher candidate rank to the monitor 15 via the output unit 607. In step S1016, the information processing apparatus 11 presents information, to a user, that the template has been selected.

In addition, when there is a plurality of templates having the same evaluation, in step S1016, the information processing apparatus 11 outputs the plurality of templates to the monitor 15 via the output unit 607, and receives selection by user's input. In addition, the information processing apparatus 11 can automatically select the templates not by user selection, but rather by an ascending order of ID numbers or the information whether the templates are already applied to the other images.

In step S1013, when the information processing apparatus 11 does not perform the automatic selection (NO in step S1013), in step S1017, the information processing apparatus 11 outputs a list of the candidate templates in order of higher evaluation to the monitor 15 via the output unit 607 and displays it.

Since the list of the candidate templates is displayed in order of higher evaluation, the user can distinguish the evaluation at a glance. Further, for displaying the evaluation to be distinguishable, it can be configured that the template having high evaluation is framed and displayed, or different colored frames are provided according to the evaluation. In step S1018, the information processing apparatus 11 receives the selection by the user's input.

In step S1019, the information processing apparatus 11 performs combining of the selected template and the image data. In other words, the information processing apparatus 11 arranges the image in the selected template. In step S1020, the information processing apparatus 11 determines whether the images are arranged to all image frames of the selected templates.

When the information processing apparatus 11 determines that the images are not arranged to all image frames of the selected templates (NO in step S1020), the processing proceeds to step S1021. In step S1021, the information processing apparatus 11 acquires image data, which is not laid out in any templates, in the image data acquired in step S1001.

The information processing apparatus 11 acquires each imaging location of the acquired image data, and presents the image data, which is in the applicable range of the selected templates and in order of nearer distance between the optimum position and the imaging location of the image data.

Then, the information processing apparatus 11 receives the selection by a user and arranges the selected image in the image frame. The information processing apparatus 11 repeats the processing in step S1021 until the images are arranged for all image frames of the selected templates.

When the information processing apparatus 11 combines the images with all image frames of the selected templates (YES in step S1020), in step S1022, the information processing apparatus 11 determines whether templates are determined to all images input in step S1001.

When the information processing apparatus 11 determines that the templates are not yet selected to all images (NO in step S1022), the processing returns to step S1008, and the information processing apparatus 11 executes again the subsequent processing. When the information processing apparatus determines that the templates are selected to all images (YES in step S1022), in step S1023, the creation unit 608 generates all templates, in which images are arranged in step S1019 and in step S1021, as album printing data and outputs the data to, for example, the printer 14 by the output unit 607.

Accordingly, in the present exemplary embodiment, the information processing apparatus 11 acquires distances between imaging locations of a plurality of images to use in an album, determines predetermined position ranges (range levels) based on the distances between the imaging locations, selects the determined templates, in which predetermined position ranges are set, as templates for laying out the designated images, and recommends them to a user.

Therefore, the information processing apparatus 11 presents and recommends templates having an uniform range level to each image as the first candidate, based on imaging locations of a plurality of images to be used for creating an album. In other words, according to the present embodiment, the information processing apparatus 11 can select a plurality of templates based on imaging locations of a plurality of images to be used for creating an album, and arrange the plurality of images to each of a plurality of templates.

Therefore, when a user uses the recommended templates, the user can create an album using templates having a sense of unity through an entirety in a distance and a position range level.

Further, since the longest distance in the distances between imaging locations is used as an image range level in the imaging order, the information processing apparatus 11 can present, to each image, templates having uniformity of a range level and taking a transfer scale at imaging into consideration.

For example, when a user creates one album using images captured in countries in Europe, the information processing apparatus 11 presents templates symbolizing each of these countries to the images captured in these countries. In other words, the information processing apparatus 11 can recommend the templates reflecting a travel scale.

Further, the information processing apparatus 11 can evaluate candidate templates and automatically select the template having highest evaluation, so that the burden of a user can be reduced and the user can create an album using templates having range levels with a sense of unity through the album.

In addition, in the present exemplary embodiment, a user creating an album adds position information to templates. However, an album can be created by using templates in which position information is added by the third party beforehand.

In addition, as the template position information, latitude and longitude are used. However, the position information is not limited thereto and can use an address to define range information of template position information.

FIG. 11 illustrates template position information using an address. In addition, each template illustrated in FIG. 11 is the same as each template in FIG. 7 using the position information.

The template position information 1101 is an example presenting an applicable range with an address. If the information processing apparatus 11 further has a conversion table of the position information and an address, the information processing apparatus 11 can execute the template search processing in step S1010. With this configuration, the information processing apparatus 11 can present the range level information as a unit of a town, a ward, a city, or a prefecture.

In the first exemplary embodiment, a user creating an album operates the information processing apparatus 11. However, the information processing apparatus 11 can operates as a web server.

In such a case, the external PC 13 connected to the network 12 becomes a web client apparatus and a user creating an album accesses the information processing apparatus 11 from the external PC 13. The information processing apparatus 11 receives information input from the input apparatus 16 in the first exemplary embodiment as a request, and transmits the information, which has been output to the monitor 15, to the external PC 13 as a response, so that the album creation can be executed.

Further, the present invention can be realized by executing the following processing. That is, the processing including, supplying software (a program) realizing the functions of above exemplary embodiments to a system or an apparatus via a network or various kinds of storage mediums, reading the program by a computer (or CPU or micro-processing unit (MPU)) of the system or the apparatus, and executing it.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-250059 filed Nov. 8, 2010, which is hereby incorporated by reference herein in its entirety.

What is claimed is:

1. An information processing apparatus comprising:
   an analysis unit configured to calculate a distance between a position where a first image is captured and a position where a second image is captured, the first and second images being included in a plurality of images to be used for an album;
   a selection unit configured to select a first template in which a first region corresponding to the distance calculated by the analysis unit is set and in which the first image is to be arranged and a second template in which a second region corresponding to the distance is set and in which the second image is to be arranged;
   an evaluation unit configured to evaluate candidate templates as part of selecting at least one template; and
   an output unit configured to output a candidate templates for a user to select from,
   wherein an image captured in the first region is to be arranged in the first template,
   wherein an image captured in the second region is to be arranged in the second template,
   wherein the second template is different from the first template,
   wherein the selection unit is configured to select the first template and the second template from the candidate templates according to an operation of the user,
   wherein the analysis unit acquires an image range level, from the distance calculated by the analysis unit, which corresponds to a scaling ratio used for selecting at least one candidate template in which a predetermined image range level has been set.

2. The information processing apparatus according to claim 1,
   wherein the evaluation unit evaluates a template based on the imaging location of the first or second image.

3. The information processing apparatus according to claim 1,
   wherein the evaluation unit evaluates a template based on a distance between a predetermined position set in the template and the imaging location of the first or second image.

4. The information processing apparatus according to claim 1, further comprising:
   a setting unit configured to set a range of imaging locations of arrangeable images to the first template and the second template.

5. The information processing apparatus according to claim 1, further comprising:
   a creation unit configured to arrange the first image in the first template and the second image in the second template.

6. A control method of an information processing apparatus for arranging at least one image of a plurality of images in at least one template, the control method comprising:
   calculating a distance between a position where a first image is captured and a position where a second image is captured, the first and second images being included in a plurality of images to be used for an album;
   selecting a first template in which a first region corresponding to the calculated distance is set and in which the first image is to be arranged and a second template in which a second region corresponding to the distance is set and in which the second image is to be arranged;
   evaluating candidate templates as part of selecting the least one template; and
   outputting a candidate templates for a user to select from,
   wherein an image captured in the first region is to be arranged in the first template,
   wherein an image captured in the second region is to be arranged in the second template,
   wherein the second template is different from the first template,
   wherein the selection unit is configured to select the first template and the second template from the candidate templates according to an operation of the user,
   wherein the analysis unit acquires an image range level, from the distance calculated by the analysis unit, which corresponds to a scaling ratio used for selecting at least one candidate template in which a predetermined image range level has been set.

7. A non-transitory computer-readable storage medium storing a program that, when executed by an information processing apparatus, causes the information processing apparatus to perform operations comprising:
   calculating a distance between a position where a first image is captured and a position where a second image is captured, the first and second images being included in a plurality of images to be used for an album;
   selecting a first template in which a first region corresponding to the calculated distance is set and in which the first image is to be arranged and a second template in which a second region corresponding to the distance is set and in which the second image is to be arranged;
   evaluating candidate templates as part of selecting the least one template; and
   outputting a candidate templates for a user to select from,
   wherein an image captured in the first region is to be arranged in the first template,
   wherein an image captured in the second region is to be arranged in the second template,
   wherein the second template is different from the first template, wherein the selection unit is configured to select the first template and the second template from the candidate templates according to an operation of the user, wherein the analysis unit acquires an image range level, from the distance calculated by the analysis unit, which corresponds to a scaling ratio used for selecting at least one candidate template in which a predetermined image range level has been set.

* * * * *